US009507829B1

(12) United States Patent
Elsaid

(10) Patent No.: US 9,507,829 B1
(45) Date of Patent: Nov. 29, 2016

(54) STORAGE OPTIMIZATION FOR SOCIAL NETWORKS

(71) Applicant: EMC Corporation, Hopkinton, MA (US)

(72) Inventor: Mohamed E. Elsaid, Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 463 days.

(21) Appl. No.: 14/138,756

(22) Filed: Dec. 23, 2013

(51) Int. Cl.
*G06F 17/30* (2006.01)
(52) U.S. Cl.
CPC .................. *G06F 17/3053* (2013.01)
(58) Field of Classification Search
None
See application file for complete search history.

(56) References Cited

U.S. PATENT DOCUMENTS

| | | | | |
|---|---|---|---|---|
| 2008/0172288 A1* | 7/2008 | Pilskalns | ................ | G06Q 30/02 705/14.23 |
| 2009/0217178 A1* | 8/2009 | Niyogi | ................... | G06Q 10/00 715/753 |
| 2010/0011366 A1* | 1/2010 | Gerovac | ............... | G06F 9/5083 718/104 |
| 2010/0115216 A1* | 5/2010 | Jia | ....................... | H04L 67/1097 711/162 |
| 2011/0276649 A1 | 11/2011 | Pujol et al. | | |
| 2012/0173486 A1* | 7/2012 | Park | .................... | H04L 67/1095 707/634 |
| 2012/0226748 A1* | 9/2012 | Bosworth | ........... | H04L 12/1813 709/204 |
| 2012/0317142 A1 | 12/2012 | Broecheler et al. | | |

OTHER PUBLICATIONS

Y. Huang et al., "Differentiating Your Friends for Scaling Online Social Networks," IEEE International Conference on Cluster Computing (Cluster), Sep. 2012, pp. 411-419, Beijing, China.
A. Lakshman et al., "Cassandra—A Decentralized Structured Storage System," ACM SIGOPS Operating Systems Review, Apr. 2010, pp. 35-40, vol. 44, No. 2.
Developers.google.com, "Frequently Asked Questions," https://developers.google.com/speed/public-dns/faq#countries, May 26, 2016, 13 pages.
A. Adya et al., "FARSITE: Federated, Available, and Reliable Storage for an Incompletely Trusted Environment," USENIX Association, Proceedings of the 5th Symposium on Operating Systems Design and Implementation (OSDI), Dec. 2002, 14 pages.
D.B. Terry et al., "Managing Update Conflicts in Bayou, a Weakly Connected Replicated Storage System," Proceedings of the 15th ACM Symposium on Operating Systems Principles (SOSP), Dec. 1995, pp. 172-183, vol. 29, No. 5.

(Continued)

*Primary Examiner* — James Trujillo
*Assistant Examiner* — Aida Tessema
(74) *Attorney, Agent, or Firm* — Ryan, Mason & Lewis, LLP

(57) ABSTRACT

Systems and methods are provided for optimizing allocation of storage resources for computing systems. For example, a method includes performing a storage allocation process to optimize storage of user data in data centers of a computing system. The storage allocation process includes determining a ranking of each data center in the computing system for a given user, and selecting a data center to store user data of the given user, based at least in part on the determined rankings of the data centers for the given user. The data centers are ranked using a ranking function which includes an access ratio that is determined as ratio of (i) a number of times that each of a total number of users in the given data center have accessed shared data of the given user to (ii) a number of data uploads that the given user has made to the computing system.

20 Claims, 4 Drawing Sheets

(56) References Cited

OTHER PUBLICATIONS

G. Decandia et al., "Dynamo: Amazon's Highly Available Key-Value Store," Proceedings of the 21st ACM Symposium on Operating Systems Principles (SOSP), Oct. 2007, pp. 205-220, vol. 41, No. 6.

D.A. Tran et al., "S-CLONE: Socially-Aware Data Replication for Social Networks," Computer Networks: The International Journal of Computer and Telecommunications Networking, May 2012, pp. 2001-2013, vol. 56, No. 7.

K. Nguyen et al., "Preserving Social Locality in Data Replication for Online Social Networks," 31st International Conference on Distributed Computing Systems Workshops, Jun. 2011, pp. 129-133.

G. Liu et al., "Selective Data Replication for Online Social Networks with Distributed Datacenters," 21st IEEE International Conference on Network Protocols (ICNP), Oct. 2013, 10 pages.

* cited by examiner

STORAGE OPTIMIZATION FOR SOCIAL NETWORKS

FIELD

The field relates generally to data storage systems and, more particularly, to systems and methods for optimizing storage allocation of user data in data centers of social networks.

BACKGROUND

In recent years, there has been an exponential growth in the use of various on-line social network applications such as Facebook, Twitter, Flickr, YouTube and Blogger, for example. In general, social network applications are implemented using a computing platform that is capable of serving millions of users at a given time using thousands of clustered compute nodes (servers) located within data centers that reside in various geographical locations around the world. One primary consideration for data storage scaling of online social networks is the ability to optimally allocate user data in storage nodes within the data centers to thereby reduce access time and minimize the costs of storage and intra-cluster communication. With social network applications, users will access their own data, as well as interact with and access the data of other users. Accordingly, the scope of user interactions in social networks poses significant challenges to optimizing data allocation.

SUMMARY

Embodiments of the invention generally provide systems and methods for optimizing allocation of storage resources for computing systems. In one embodiment of the invention, a method includes storing user data in a plurality of data centers of a computing system, and performing a storage allocation process to optimize storage of the user data in the data centers of the computing system. The user data includes shared data that is shared between users of the computing system. The storage allocation process includes determining a ranking of each data center in the computing system for a given user of the computing system, and selecting a data center to store user data of the given user, based at least in part on the determined rankings of the data centers for the given user. For example, the highest ranked data center can be selected to store user data of the given user. The step of determining a ranking includes ranking a given data center as a function of an access ratio that is determined as a ratio of (i) a number of times that each of a total number of users in the given data center have accessed shared data of the given user to (ii) a number of data uploads that the at least one user has made to the computing system.

In another embodiment of the invention, the process of ranking a given data center further includes dividing the access ratio by a total number of users having user data stored in the given data center.

In yet another embodiment of the invention, the computing system is a social network application, wherein the storage allocation process is used to optimize the storage allocation of user data in data centers of the social network to thereby minimize an average delay that users experience when accessing and reading data (e.g., pictures, posts, feeds, etc.) that is shared by their friends in the social network.

These and other embodiments of the invention will be described in further detail in the following detailed description of illustrative embodiments, which is to be read in conjunction with the accompanying drawings.

DETAILED DESCRIPTION

Embodiments of the invention as discussed herein generally include systems and methods for optimizing allocation of storage resources for computing systems. For example, illustrative embodiments of the invention include systems and methods to optimize the storage allocation of user data in data centers of a social network to thereby minimize an average delay that users experience for accessing and reading the on-line data (e.g., pictures, posts, feeds, etc.) of other users in the social network. In one embodiment, storage optimization is realized by utilizing a ranking function to rank available data centers of a social network provider on a per user basis, and then selecting, for each user, a data center having a highest ranking to store that user's uploaded data in a manner that minimizes the time for accessing the user's data by other users (e.g., friends) in the social network. As discussed in further detail below, in one embodiment of the invention, a ranking function is based on various parameters including, for example, user location, a user's friendship matrix, locations of the user's friends, a rate or frequency or number of times that the user's data is accessed by other users, and/or other parameters.

Figure 1:
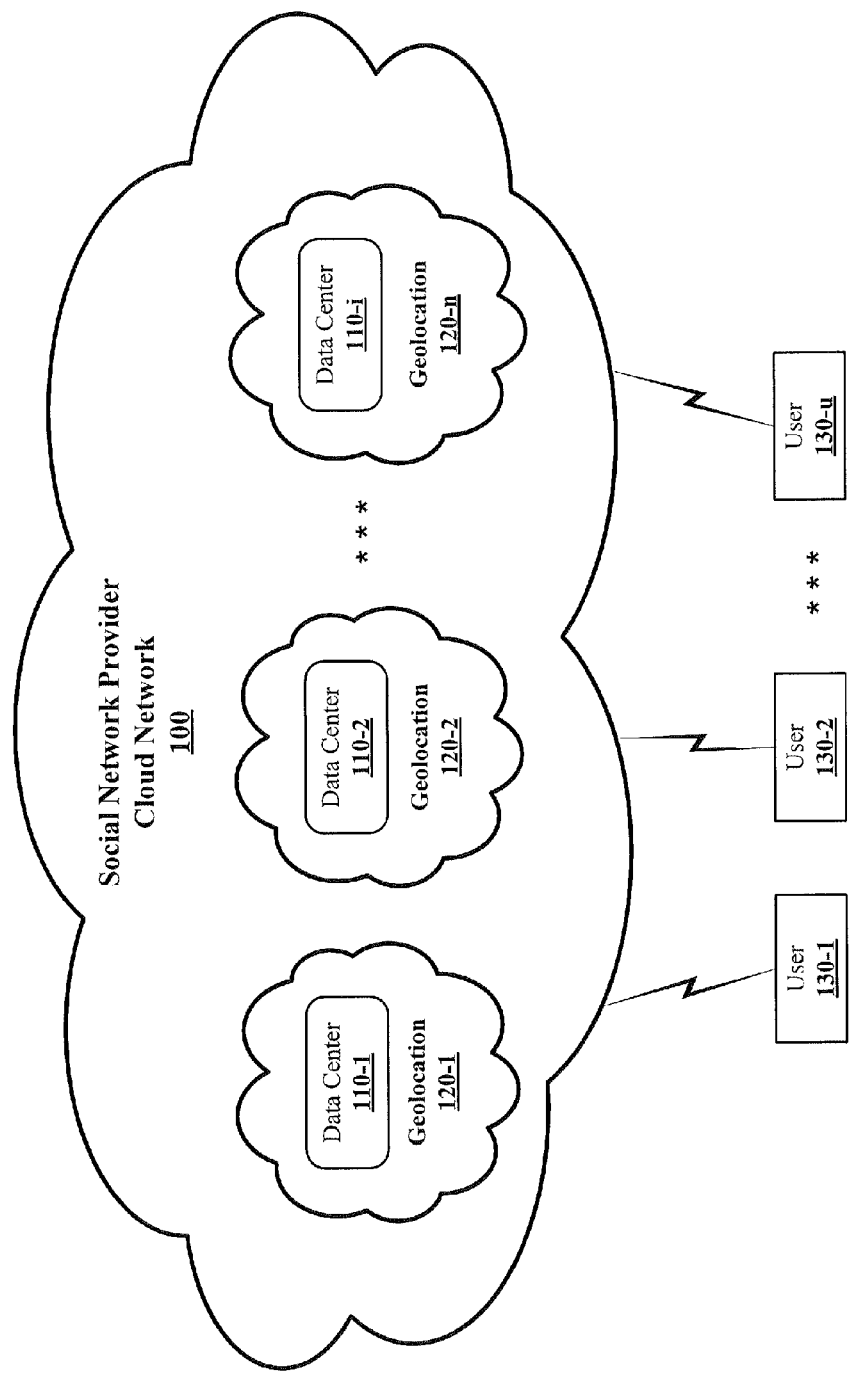
FIG. 1 illustrates a cloud computing environment in which techniques are implemented for optimizing storage allocation of user data in data centers of a social network, according to an embodiment of the invention.

FIG. 1 illustrates a cloud computing environment in which techniques are implemented for optimizing storage allocation of user data in data centers of a social network according to an embodiment of the invention. In particular, FIG. 1 illustrates a cloud computing network 100 of a social network provider (or social network provider network 100), which comprises a plurality (i) of data centers 110-1, 110-2, . . . , 110-$i$ that are located in a plurality (n) of different geographic locations (geolocations) 120-1, 120-2, . . . , 120-$n$, within the cloud computing network 100. FIG. 1 further illustrates a plurality (u) of social network users 130-1, 130-2, . . . , 130-$u$, which can access the social network provider network 100 and upload their own data or otherwise access the data of other users, which is stored in storage servers within the data centers 110-1, 110-2, . . . , 110-$i$.

The geolocations 120-1, 120-2, . . . , 120-$n$ shown in FIG. 1 generically represent n different geographic locations in which the data centers 110-1, 110-2, . . . , 110-$i$ of the social network provider network 100 reside. The geolocations 120-1, 120-2, . . . , 120-$n$ shown in FIG. 1 may represent different continents of the world, different countries, different regions within a given continent, different regions within a given country, etc., or any combination thereof. The number (i) of data centers may or may not be the same as the number (n) of different geolocations shown in FIG. 1. For instance, the geolocation 120-1 may represent a country (e.g., the United States), which may have one data center 110-1, or more than one data center located in different sub-geolocations within the given geolocation 120-1. However, for ease of illustration, FIG. 1 shows one data center per geolocation (i.e., i=n). Moreover, it is to be understood that the plurality of users 130-1, 130-2, . . . , 130-u shown in FIG. 1 represents the population (at any given time) of total number (u) of social network users which access the social network provider network 100. Moreover, the plurality of users 130-1, 130-2, . . . , 130-u represent different users that reside within or near the various geolocations 120-1, 120-2, 120-n shown in FIG. 1.

The term "social network" as used herein generally refers to an online community of people who use a Web site, online service, or other types of computing systems to communicate with each other and share information, data, resources, etc., The term "social network" also refers to the Web site or online service that facilitates such communication. Some common examples of "social networks" include Facebook, Twitter, Flickr, YouTube and Blogger, for example.

The term "friend" with regard to a given user generally refers to another user who is authorized, either expressly or impliedly or by default, to access the data, information, resources, etc., of the given user. For instance, in the context of the social network Facebook, the term "friends" denotes individuals who have mutually agreed to allow each other to view information on each other's profile, and follow each other's postings, and post on each other's wall, etc. One user may request another user to be a "friend," but the other user must accept the request, thereby requiring authorization for accessing/sharing user data. On the other hand, a social network such as YouTube generally allows one user to view uploaded video content of another user without specific authorization (i.e., the uploaded user content is publically available for access by other users of YouTube).

Moreover, the term "data center" as used herein generally refers to a facility that houses computer systems and associated components, such as application servers and storage systems. In particular, a "data center" is a facility that houses various equipment, such as computers, servers (e.g., web servers, application servers, database servers), switches routers, data storage devices, load balancers, wire cages, vaults, racks, and related equipment. Data centers are used to store, manage, process, and exchange digital data and information, and provide application services or management for various data processing, such as web hosting internet, intranet, and information technology. Moreover, the phrases "computing system" and "data storage system" as used herein are intended to be broadly construed, so as to encompass, for example, private or public cloud computing or storage systems, as well as other types of systems comprising distributed virtual and/or physical infrastructure.

Figure 2:
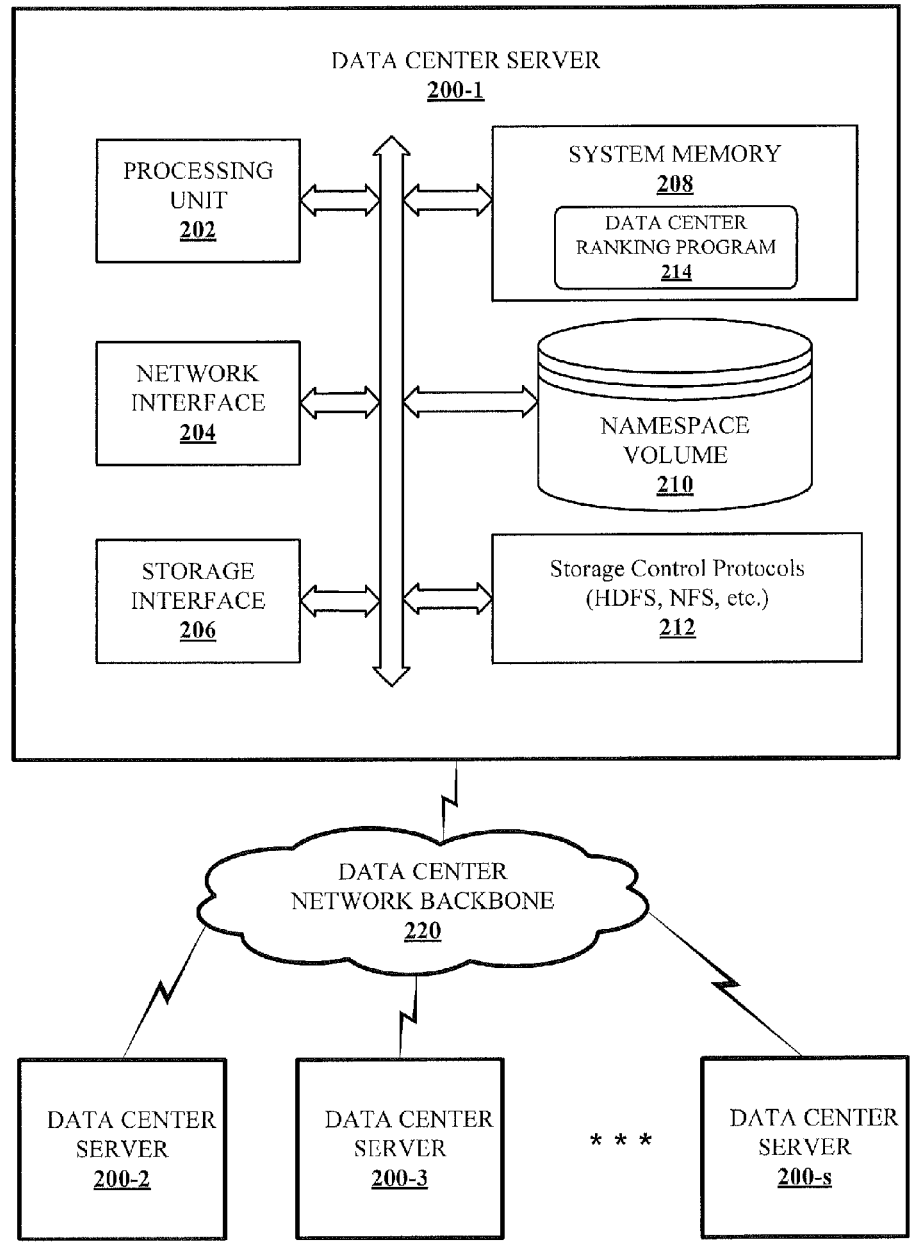
FIG. 2 illustrates a computing system which implements methods for optimizing storage allocation of user data in data centers of a social network, according to an embodiment of the invention.

FIG. 2 illustrates a computing platform which implements methods for optimizing storage allocation of user data in data centers of a social network, according to an embodiment of the invention. In particular, FIG. 2 illustrates a computing platform 200 on which the social network provider network 100 of FIG. 1 may be implemented. The computing platform 200 comprises a plurality (s) of servers 200-1, 200-2, 200-3, . . . , 200-s, which communicate with one another over a network 220. The plurality of servers 200-1, 200-2, 200-3, 200-s include a combination of application servers and data storage servers for performing data computing and storage functions that support a social network application. It is to be understood that the computing platform 200 shown in FIG. 2 may represent a single data center of a given social network provider, wherein the plurality of servers 200-1, 200-2, 200-3, . . . , 200-s represent a cluster of application and data storage servers within one data center facility. Alternatively, the computing platform 200 shown in FIG. 2 may represent two or more or all data centers of a given social network provider, wherein the plurality of servers 200-1, 200-2, 200-3, 200-s represent the collection of clustered application and data storage servers within multiple data centers of the social network provider.

The network 220 may comprise, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed, so as to encompass a wide variety of different network arrangements, including combinations of multiple networks possibly of different types.

As shown in FIG. 2, the server 200-1 comprises a processing unit 202, network interface circuitry 204, storage interface circuitry 206, system memory 208, a namespace volume database 210, and a storage control protocol module 212. The processing unit 202 comprises one or more of a computer processor, a microprocessor, a microcontroller, an application-specific integrated circuit (ASIC), a field programmable gate array (FPGA) or other type of processing circuitry, as well as portions or combinations of such circuitry elements. The network interface circuitry 204 enables the server 200-1 to interface and communicate with the network 220 and other system components. The network interface circuitry 204 may comprise conventional transceivers of a type well known in the art.

The storage interface circuitry 206 enables the server 200-1 to interface with storage devices and control the storage of user data and application data associated with a social network application. The storage interface circuitry 206 utilizes file system metadata and/or namespace metadata stored in the namespace volume database 210 to manage a file system for one or more namespace volumes. Moreover, the storage interface circuitry 206 utilizes one or more of the storage control protocols 212 to read, write and otherwise access data in persistent storage devices such as flash memory devices, DAS (direct attached storage) devices, NAS (network-attached storage) devices, etc., depending on the storage system utilized. For example, the storage control protocols may include known protocols such as NFS (network file system) and HDFS (Hadoop Distributed File System) protocols, for example.

Furthermore, the system memory 208 comprises electronic memory such as random access memory (RAM), read-only memory (ROM) or other types of memory, in any combination. The system memory 208 stores one more software programs having instructions that are read and processed by the processing unit 202 to implement various functions associated with the given computing environment in which the server 200-1 operates (e.g., social network application in the exemplary embodiment). For example, as shown in FIG. 2 by way of example, the system memory 208 stores a data center ranking program 214 which, as explained in further detail below, uses a data ranking function to rank data centers within a social provider network to determine an optimal data center location for storing data of a given user to minimize access latency of the user data by other users. The system memory 208 (or other storage device) having such program code tangibly embodied thereon is an example of what is more generally referred to herein as a processor-readable storage medium. Other examples of processor-readable storage media embodying program code include, for example, optical or magnetic disks. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

It is to be understood that the other servers 200-2, 200-3, . . . , 200-s of the computing platform 200 shown in FIG. 2 may be configured in a manner that is the same or similar to the generate architecture of the server 200-1 depicted in FIG. 2. The constituent components and modules of a given data center server can vary depending on whether the given server operates as an application server, a data storage server, or both. The computing platform 200 shown in FIG. 2 may comprise additional known components such as batch processing systems, parallel processing systems, physical machines, virtual machines, virtual switches, storage volumes, logical units, etc. Again, the particular computing platform shown in FIG. 2 is presented by way of example only, and the system 200 may include additional or alternative processing platforms, as well as numerous distinct processing platforms in any combination.

For example, in another embodiment, the cloud computing network 100 depicted in FIG. 1 may be comprised of a plurality of virtual machines (VMs) that are implemented using a hypervisor. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices.

The cloud computing network 100 of FIG. 1 may comprise other infrastructure such as sets of applications running on respective ones of the virtual machines (utilizing associated logical storage units or virtual disks) under the control of the hypervisor. In one embodiment, the cloud computing network 100 is configured with multiple hypervisors, each running on its own physical infrastructure, wherein portions of that physical infrastructure may be virtualized. An example of a commercially available hypervisor platform that may be used to implement portions of the cloud computing network 100 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX® and Symmetrix VMAX®, both commercially available from EMC Corporation (Hopkinton, Mass.). A variety of other storage products may be utilized to implement at least a portion of the cloud computing network 100 of FIG. 1.

As noted above, embodiments of the invention include systems and methods for optimizing the storage allocation of user data in data centers of a social network environment, which minimizes an average delay in accessing and reading the on-line data (e.g., pictures, posts, feeds, etc.) of other users in a social network. In a social network computing environment in which data of the social network users is stored in storage servers of various data centers located in different countries around the world, for example, various factors may be considered to determine an optimal data center location for storing the data of a given user so that friends of that user can access the user's data with minimal latency. For example, assume that a given user lives in Egypt and has many social network friends that live in the United States and some social network friends that live in Europe. Assume further that many of the social network friends of the given user who live in the United States frequently access the uploaded data, pictures, posts, etc. of the given user. In this simple example, considering that most of the user's friends live in the United States and these friends frequently access the user's data, from a viewpoint of minimizing access latency, it would be optimal to store the user's data in storage servers of a data center located in the United States. Indeed, while the user may live in Egypt and experience some latency in having his/her data uploaded and stored in a remote data center location in the United States, the access latency and network communication bandwidth associated with accessing the user's data is minimized as the user's data is stored in a data center location that is closest to a majority of the social network friends of the user who frequently access the user's data.

In accordance with embodiments of the invention, the data center ranking program 214 (FIG. 2), which executes on one or more servers in one or more data centers of the social network provider, implements a data ranking function to automatically rank each data center on a per user basis to determine an optimal data center location for storing data of a given user which minimizes access latency of the user's data by other users. In one embodiment of the invention, a data center ranking function is defined as follows:

$$Rank_u(DC_i) = \frac{\sum_{f_u=1}^{F_u(i)} R_{f,i}}{U_i}, \quad \text{Eqn. (1)}$$

wherein $$R_{f,i} = \frac{\text{number of reads by friends } (f)}{\text{number of data uploads by user } (u)} \quad \text{Eqn. (2)}$$

In the above Eqns. (1) and (2), the parameter u denotes a social network user ID, and the parameter i denotes a data center (DC) index number. Moreover, the parameter $f_u$ denotes a friend ID of a given user u, and the parameter $F_u(i)$ denotes a total number of friends (for a given user u) whose data is stored in a given datacenter i. The parameter $U_i$ denotes a total number of social network users whose data is stored in a given data center i. The parameter $R_{f,i}$ is referred to herein as a "reading ratio" (or access ratio) for a given friend f at a given datacenter i. In general, the term "reading ratio" (generally denoted as $R_f$) is a measure of a friend's interest in data that is shared by a given user u in the social network. The value of $R_f$ represents a ratio of the number of times a given friend f, (of a given user u) accesses/reads data that is shared/uploaded by the given user u (e.g., the user's uploaded data, pictures, posts, feeds, etc.) to the number of data uploads (e.g., uploaded data, pictures, posts, feeds, etc.) that the given user u has made to the social network.

The $\text{Rank}_u(DC_i)$ represents a ranking of a given datacenter i for a given user u. This ranking function is applied to rank each data center i of a social network provider on a per user basis. More specifically, in one embodiment of the invention, for a given user u, a rank is determined for a given data center i (via Eqn. (1)) by summing the determined reading ratio $R_f$ values of each of the user's friends $f_U$ whose data is stored in the given data center i, and then dividing the sum (i.e., $\Sigma_{f_u=1}^{F_u(i)} R_{f,i}$) by $U_i$ for the given data center i. For example, if a given user u has five (5) friends whose social network data is stored in a given data center i (i.e., $F_u(i)=5$), the sum $\Sigma_{f_u=1}^{F_u(i)} R_{f,i}$ would be computed by adding the determined reading ratios $R_f$ of those five friends whose data is stored in a storage server of the given data center i. In this regard, the sum $\Sigma_{f_u=1}^{F_u(i)} R_{f,i}$ can be considered an "access ratio" that is determined as a ratio of (i) a number of times that each of a total number of users (friends) $F_u(i)$ in the given data center have accessed shared data of the given user u to (ii) a number of data uploads that the given user u has made to the computing system.

It is to be understood that with regard to the ranking function (Eqn. (1)), the summation $\Sigma_{f_u=1}^{F_u(i)} R_{f,i}$ of the reading ratios is not just a measure of the number of a given user's friends having data stored in a data center—this sum takes into consideration the interest in the user's friends in reading the user's feeds. For example, a user may have a large number of friends whose social network data is stored in a given data center i, but if those friends are not interested in accessing the user's feeds, the data center should not be accorded a higher ranking or otherwise considered as a location for storing the user's data. By way of example, assume that a social network user who lives in the United States has a large number of friends whose data is located in a data center in the United States, and a relatively smaller number of friends whose data is located in a data center in Egypt. Assume further that very few of the user's friends in the United States access the user's feeds, while most of the user's friends in Egypt frequently access the user's feeds, In this scenario, it may be more optimal to store the user's social network data in a data center in Egypt (as compared to the United States) since the user's friends in Egypt more frequently access the user's social network feeds. Therefore, the ranking function generally accords a higher rank for storing the social network data of a given user in a given data center that is located close to where the user's friends reside, who show interest in accessing the user's data.

Moreover, while the summation $\Sigma_{f_u=1}^{F_u(i)} R_{f,i}$ of reading ratios in Eqn. (2) takes into consideration a number of the user's friends in a given data center and their interest in accessing the user's feeds, in one embodiment of the invention, the ranking function of Eqn. (1) further takes into consideration load balancing issues by virtue of the parameter $U_i$. Indeed, if a given data center i is optimal for storing a user's data from the perspective of a large number of the user's friends in that data center who show interest in accessing the user's feeds, the given data center may be overloaded with a large number of users $U_i$ having data stored in the data center. Therefore, from a latency point of view, it may be more optimal to store the user's data in another less loaded data center which is located near that optimal, yet overloaded data center.

Figure 3:
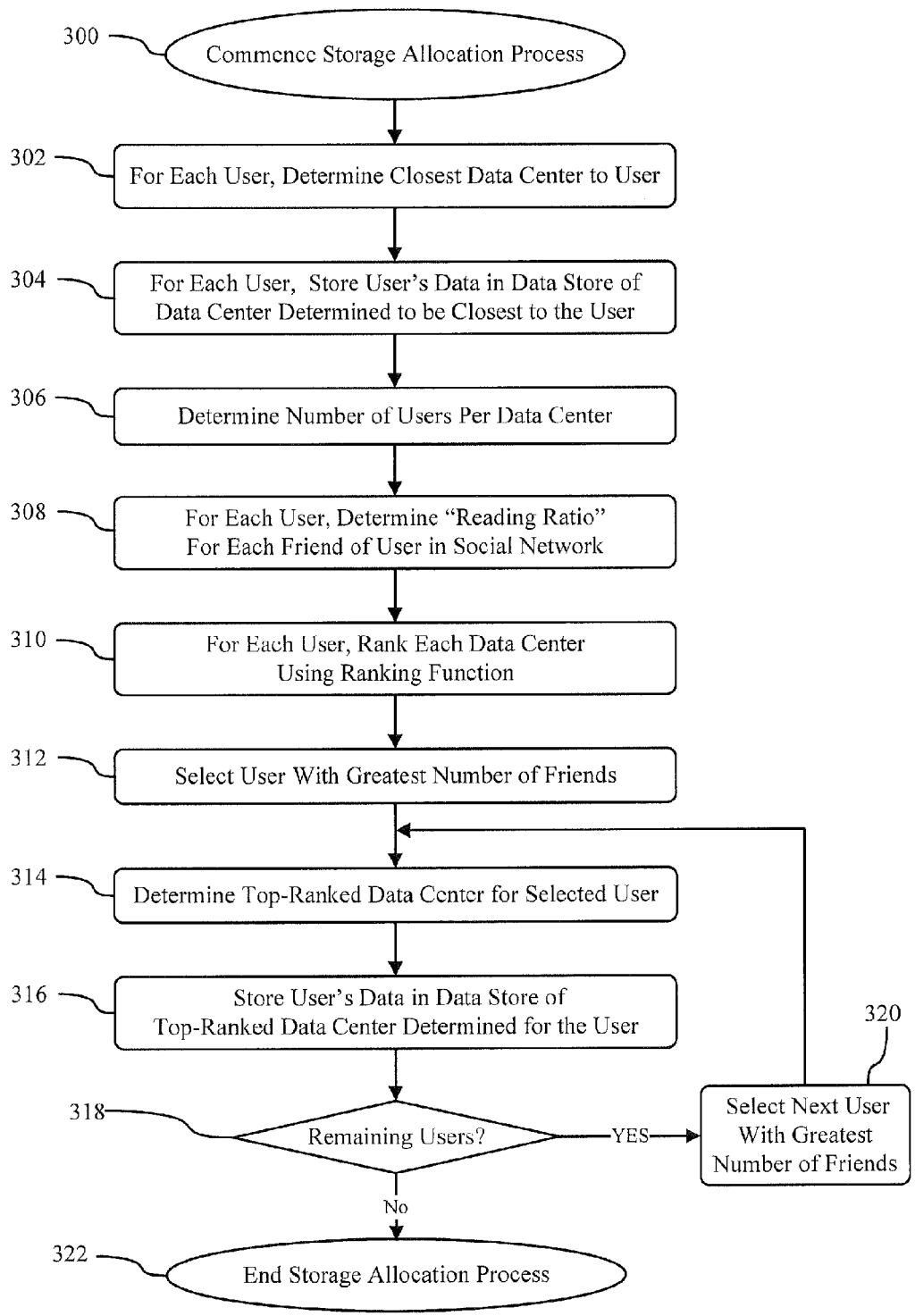
FIG. 3 is a flow diagram of a method for optimizing storage allocation of user data in data centers of a social network, according to an embodiment of the invention.

FIG. 3 is a flow diagram of a method for optimizing storage allocation of user data in data centers of a social network, according to an embodiment of the invention. In one embodiment, the method of FIG. 3 illustrates process steps that are implemented by executing the data center ranking program 214 shown in FIG. 2 using the data ranking function discussed above. A social network service provider will commence a storage allocation process (block 300) at a given time to optimize storage allocation of user data across the plurality of data centers that are utilized by the service provide to support a social network application. An optimization process as shown in FIG. 3 can be implemented on a periodic basis, e.g., monthly, yearly, etc., depending the needs and desires of the given service provider. The data ranking process can executed across a plurality of different servers in different geolocations so as to distribute the workload for storage allocation optimization and perform the process at certain times in the different geolocations where the social network is not loaded.

Initially, for each user of the social network, the data center ranking process will determine the closest data center to each user (block 302). This determination may be made by each user sending an echo message to the social network, which enables the data center ranking process to determine the data center which is geographically the closest to the user's location. Other techniques can be used to determine the closest locations of data centers to users of the social network. Thereafter, for each user of the social network, the social network data of that user will be stored in a storage server in the data center that is determined to be geographically closest to that user (block 304).

A next step in the exemplary process is to determine a number of users per data center (block 306). As discussed above with regard to the data ranking function of Eqn. (1), this step determines the parameter $U_i$ for each data center, wherein $U_i$ denotes a total number of social network users whose data is stored in a given data center i. Then, for each user u, the "reading ratio" $R_f$ is determined for each friend $f_u$ of the user u in the social network (block 308). For example, in one embodiment of the invention, the "reading ratio" $R_f$ is determined using Eqn, (2) for each friend $f_u$ of a given user u in the social network. As noted above, the reading ratio $R_f$ of a given friend $f_u$ of a given user u provides a measure of that friend's interest in the data that is shared by the given user u in the social network.

It is to be understood that the value of the parameter in the numerator of Eqn. (2) (i.e. number of reads by friend (f)) can be determined based on a number of times that shared data of the given user u was accessed by the given friend $f_u$ in some predetermined period of time prior to performing the storage allocation process. The predetermined period of time can be a month, a year, or the time period between performance of a previous storage allocation process and the current storage allocation process, or any other predetermined period of time. In another embodiment, the value of the parameter in the denominator of Eqn. (2) (i.e. number of data uploads by user (u)) can be determined based on a number of data uploads (e.g., uploaded data, pictures, posts, feeds, etc.) that the given user makes to the social network during the same predetermined period of time prior to performing the storage allocation process.

A next step in the exemplary process includes utilizing a ranking function to rank each data center of the social network, on a per user basis (block 310). More specifically, in one embodiment of the invention, each data center of the social network is ranked, on a per user basis, using Eqn. (1) and the data computed for parameters $R_f$ and $U_i$. For a given user u, a rank is determined for a given data center i (via Eqn. (1)) by summing the determined reading ratio $R_f$ values of each of the user's friends $f_u$ whose data is stored in the given data center i, and then dividing the sum (i.e., $\Sigma_{f_u=1}^{F_u(i)} R_{f,i}$) by the determined value $U_i$ for the given data center i.

The ranking process of block 310 is performed on a per user basis, so that each user u in the social network has set of ranked data centers associated therewith. In one embodiment of the invention, the top-ranked data center in the set of ranked data centers for a given user u is selected for storing the social network data of the given user u. As noted above, the ranking function is formulated such that for each user, a given data center i having the greatest number of friends of that user with high reading ratios, should have a higher ranking. In yet another embodiment of the invention, to take into consideration load balancing between the different data centers, the sum $\Sigma_{f_u=1}^{F_u(i)} R_{f,i}$ is divided by a total number of social network users $U_i$ whose data is stored in a given data center i. Thus, a data center having stored data of a smaller total number of social network users will have a higher ranking.

In another embodiment of the invention, other factors may be considered in selecting a high-ranking data center for storing the social network data of the given user u, as opposed to selecting the highest or top-ranked data center. For example, assume that for a given user u, a first data center has the highest ranking, and that a second data center has the next highest ranking, wherein the ranking values of the first and second data centers are very close. Assume further that the first (top-ranked) data center is geographically located further away from the given user u (i.e., the second data center is geographically located closer to the given user u). In this example, since the ranking values of the first and second data centers are very close, the second data center may be selected to store the social network data of the given user u as a way of minimizing the delay in uploading the user's data, while at same time taking into consideration a data center location that minimizes the latency of accessing such data by friends of the user.

Next, after the data center ranking process is completed with respect to all or at least one or more of the social network users, a data migration process is performed to move the data of a given social network user from a current data center to another data center which has a higher ranking. In particular, in one embodiment, this process begins by selecting the user with the greatest number of friends (block 312), and determining the top-ranked data center for the selected user (block 314). If the top-ranked data center of the selected user is not the data center in which the user's data is currently stored, a migration process is performed to store the user's data in one or more storage servers of another data center that is determined to have the highest ranking for that user (block 316). In another embodiment of the invention, a migration process can be performed to store the user's data in one or more storage servers of another data center that is determined to have a ranking that is higher than the data center in which the user data is current stored. The data migration process can be implemented using well-known methods. For the remaining users (bock 318), the process selects the next user with the greatest number of friends (block 320), and the process of blocks 314 and 316 is repeated. When the storage allocation optimization process has been completed for all users (block 318), the storage allocation process is terminated.

It is to be understood that depending on the population of social network users and their geographic locations, the friends of a given user may be located in only one data center, or distributed over two or more or all data centers of the social network. In this regard, one or more data centers of a social network may have a ranking of "0" for a given user. In this regard, for purposes of load balancing, although a given data center may be highly ranked for a given user, or although only one data center may have a rank, other factors can be considered in storing the user's data in a data center which has no ranking or a low ranking, but which is geographically close to the top-ranked data center.

To illustrate the advantages of rank-based storage allocation techniques as discussed herein, computer simulations were performed to compare the performance of a rank-based storage allocation process according to an embodiment of the invention with several conventional storage allocation protocols that are currently implemented by current social networks. For instance, Facebook is a well-known social network that operates many data centers throughout the world. For purposes of managing distributed data across the various data centers, Facebook currently utilizes the known Apache Cassandra tool, in which data is distributed across nodes in a server cluster using a consistent hashing algorithm based on an order preserving hash function. Moreover, the social network Twitter currently uses the same algorithm (Apache Cassandra) for distributed storage and management of its data. Other social network providers such as Google utilize the Anycast protocol, which is a network addressing and routing protocol in which data from a sender is routed to a topologically nearest node in a group of potential receivers (e.g., requests are directed to nearest DNS server).

Computer simulations were performed using MATLAB to compare the performance of a rank-based storage allocation process according to an embodiment of the invention with a consistent hashing protocol (as used by Facebook) and a "closest datacenter" protocol in which the social network data of a given user is stored in a data center that is closest to the user. The computer simulations were configured to determine an average delay in accessing user data from data centers geographically distributed over the world (the results of which will be discussed below with reference to FIG. 4). As part of a problem formulation, delay calculations were performed based on the following delay formulas:

$$D_{u,f_u} = \frac{L_{u,i_{f_u}}}{V_{prop}} + T_{proc} \times U_i \quad \text{Eqn. (3)}$$

$$\text{Avg. } D_u = \Sigma_{f_u=1}^{F_u} D_{u,f} \quad \text{Eqn. (4)}$$

$$\text{Avg. } D = \Sigma_{u=1}^{U} \text{Avr. } D_u \quad \text{Eqn. (5)}$$

In the delay formulations, the parameter $D_{u,f_u}$ denotes a delay between a given user u and a friend $f_u$ of the user. The parameter $L_{u,i_{f_u}}$ denotes a distance between a location of the given user u and a data center i that stores the data of the friend $f_u$. The parameter $V_{prop}$ denotes a signal propagation speed. The parameter $T_{proc}$ denotes a server transaction processing time. The parameter $U_i$ denotes the number of users in a given data center i. The parameter $F_u$ denotes a total number of friends of a given user u. The parameter Avg. $D_u$ denotes an average delay across all friends of the user u. The parameter Avg. D denotes an average delay for all users. The parameter U denotes a total number of users in the social network.

In addition, as part of the problem formulation, the following testing environment was defined for a social network. The population of data centers was defined to span an area of length=36,750 kin, and a width=19,500 km, which values approximate the length and width of the world map. The total number of users U in the social network was a variable that was defined for 100, 500, 1000, 1,500 and 2,000 users. The population of users U was uniformly distributed over the defined area. The locations (X,Y) of the data centers were defined in the following table, wherein the values in the table were selected to simulate one data center located in each continent of the world.

| $X * 10^6$ | $Y * 10^6$ |
|---|---|
| 10.719 | 6 |
| 6.891 | 11.25 |
| 20.672 | 9.75 |
| 18.375 | 12.75 |
| 31.391 | 4.5 |
| 27.563 | 10.5 |
| 29.094 | 15 |

Furthermore, a friendship matrix was defined using a random distribution.

Figure 4:
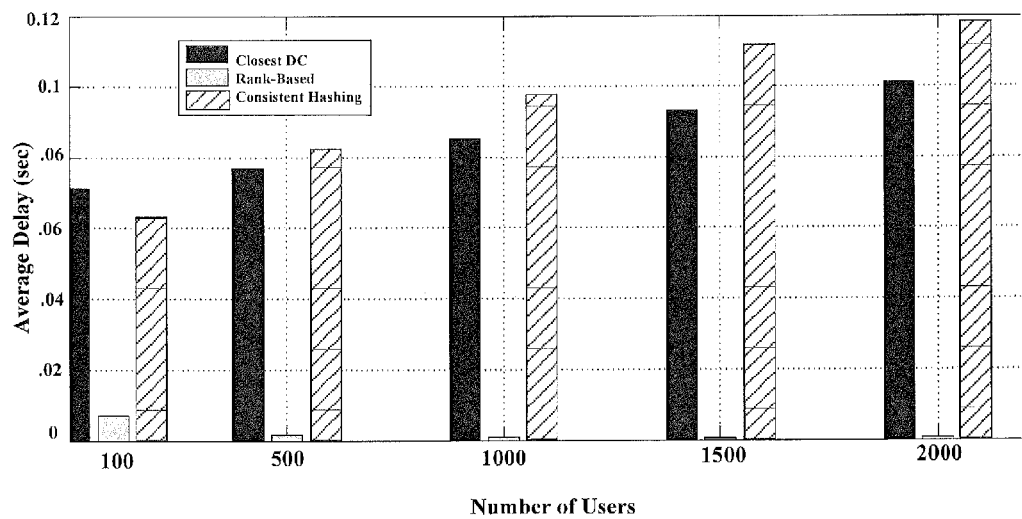
FIG. 4 is a graph that shows computer simulation results of average user delay in accessing data for different number of users between conventional storage allocation techniques and a ranking-based storage allocation technique according to an embodiment of the invention.

The delay formulations and testing environment were defined and processed using MATLAB simulations, resulting in the performance test results shown in FIG. 4. In particular, FIG. 4 is a graph that shows computer simulation test results of an average user delay in accessing data over different size populations of users between conventional storage allocation techniques and a ranking-based storage allocation technique according to an embodiment of the invention. FIG. 4 compares the average user delay (in seconds) between a rank-based storage allocation process as described herein and a conventional consistent hashing and closest DC protocol. The simulation results in FIG. 4 show that a rank-based storage allocation process results in much less average user delay as compared to the conventional storage allocation protocols. Moreover, the test results in FIG. 4 show that with regard to a rank-based storage allocation method, the average delay in accessing user data decreases as the total number of users increases, whereas the average delay in accessing user data increases as the total number of users increases with the conventional storage allocation methods. The MATLAB test results of FIG. 4 indicate that it is not optimum, from an access delay point of view, to store user data based on consistent hashing or nearest DC protocols.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   storing user data in a plurality of data centers of a computing system, wherein the user data comprises shared data that is shared between users of the computing system; and
   performing a storage allocation process to optimize storage of the user data in the data centers of the computing system, wherein performing a storage allocation process comprises:
   determining a ranking of each data center in the computing system for at least one user of the computing system, wherein determining a ranking comprises ranking a given data center as a function of a sum of access ratio values of friends of the at least one user, whose data is stored in the given data center, wherein an access ratio value of a given friend of the at least one user comprises a ratio of (i) a number of times that the given friend whose data is stored in the given data center has accessed the shared data of the at least one user to (ii) a number of data uploads of shared data that the at least one user has made to the computing system; and
   selecting a data center to store user data of the at least one user, based at least in part on the determined rankings of the data centers for the at least one user, to reduce an average access delay experienced by the friends of the at least one user in accessing the shared data of the at least one user;
   wherein one or more of the storing and performing steps are performed under control of at least one processing device.

2. The method of claim 1, wherein selecting a data center comprises selecting a highest ranked data center to store the user data of the at least one user.

3. The method of claim 1 further comprising migrating the user data of the at least one user to the selected data center of the computing system.

4. The method of claim 3, wherein migrating is performed for each of the plurality of users in an order based on users having a greatest number of friends with whom data is shared.

5. The method of claim 1, wherein the computing system comprises a social network.

6. The method of claim 1, wherein ranking a given data center further comprises dividing said access ratio by a total number of users having user data stored in the given data center.

7. The method of claim 1, wherein said number of times that the given friend whose data is stored in the given data center has accessed the shared data of the at least one user is based on a number of times that said shared data was accessed by the given friend in a given period of time prior to performing the storage allocation process.

8. The method of claim 1, wherein storing user data in a plurality of data centers of a computing system comprises initially storing the user data of each user in one of the data centers that is closest to that user.

9. An article of manufacture comprising a processor-readable storage medium having encoded therein executable code of one or more software programs, wherein the one or more software programs when executed by the at least one processing device implement the steps of the method of claim 1.

10. An apparatus of a computing system, the computing system comprising a plurality of data centers for storing user data, wherein the user data comprises shared data that is shared between users of the computing system, the apparatus comprising:
   a processor; and
   a memory coupled to the processor, wherein the memory comprises program instructions that are executed by the processor to perform a storage allocation process to optimize storage of the user data in the data centers of the computing system, wherein the storage allocation process comprises:
  determining a ranking of each data center in the computing system for at least one user of the computing system, wherein determining a ranking comprises ranking a given data center as a function of a sum of access ratio values of friends of the at least one user, whose data is stored in the given data center, wherein an access ratio value of a given friend of the at least one user comprises a ratio of (i) a number of times that the given friend whose data is stored in the given data center has accessed the shared data of the at least one user to (ii) a number of data uploads of shared data that the at least one user has made to the computing system; and
  selecting a data center to store user data of the at least one user, based at least in part on the determined rankings of the data centers for the at least one user, to reduce an average access delay experienced by the friends of the at least one user in accessing the shared data of the at least one user.

11. The apparatus of claim 10, wherein selecting a data center comprises selecting a highest ranked data center to store the user data of the at least one user.

12. The apparatus of claim 10, wherein the memory further comprises program instructions that are executed by the processor to migrate the user data of the at least one user to the selected data center of the computing system.

13. The apparatus of claim 12, wherein the user data is migrated for each of the plurality of users in an order based on users having a greatest number of friends with whom data is shared.

14. The apparatus of claim 10, wherein the computing system comprises a social network.

15. The apparatus of claim 10, wherein ranking a given data center farther comprises dividing said access ratio by a total number of users having user data stored in the given data center.

16. The apparatus of claim 10, wherein said number of times that the given friend whose data is stored in the given data center has accessed the shared data of the at least one user is based on a number of times that said shared data was accessed by the given friend in a given period of time prior to performing the storage allocation process.

17. The apparatus of claim 10, wherein the memory further comprises program instructions that are executed by the processor to initially store the user data of each user in one of the data centers that is closest to that user prior to performing the storage allocation process.

18. A computing system, comprising:
  a plurality of data centers for storing user data of users of the computing system, wherein the user data comprises shared data that is shared between users of the computing system,
  wherein at least one data center comprises a server node to perform a storage allocation process to optimize storage of the user data in the data centers of the computing system, wherein performing a storage allocation process comprises:
    determining a ranking of each data center in the computing system for at least one user of the computing system, wherein determining a ranking comprises ranking a given data center as a function of a sum of access ratio values of friends of the at least one user, whose data is stored in the given data center, wherein an access ratio value of a given friend of the at least one user comprises a ratio of (i) a number of times that the given friend whose data is stored in the given data center has accessed the shared data of the at least one user to (ii) a number of data uploads of shared data that the at least one user has made to the computing system; and
    selecting a data center to store user data of the at least one user, based at least in part on the determined rankings of the data centers for the at least one user, to reduce an average access delay experienced by the friends of the at least one user in accessing the shared data of the at least one user.

19. The computing system of claim 18, wherein selecting a data center comprises selecting a highest ranked data center to store user data of the at least one user.

20. The computing system of claim 18, wherein ranking a given data center further comprises dividing said access ratio by a total number of users having user data stored in the given data center.

* * * * *